Dec. 14, 1937.  L. SAIVES  2,102,036
CLUTCH CONTROL DEVICE
Filed May 7, 1936  2 Sheets-Sheet 1

L. Saives
Inventor by Glascock Downing & Seebold
Attys.

Patented Dec. 14, 1937

2,102,036

UNITED STATES PATENT OFFICE 2,102,036

CLUTCH CONTROL DEVICE

Leon Saives, Billancourt, France, assignor to Louis Renault, Billancourt, France Application May 7, 1936, Serial No. 78,476
In France January 31, 1936

2 Claims. (Cl. 192—85)

In order to allow the time necessary for handling the treated pieces between two pressing operations of a mechanically-operated press, it is necessary to uncouple the press after each stage of the work, in its upper position, and the uncoupling should be preferably effected at the upper dead centre. The invention has for its object a device which automatically effects this uncoupling at the upper dead centre and which permits, for a given position of the press, a subsequent coupling by any suitable control.

In the device, the subject-matter of the invention, the automatic control of the uncoupling is effected by a cam which is mounted on the crankshaft of the press, and the mechanical connection between the said cam and the clutch is of such nature that it will be broken by the action of the control of the coupling, in order that after automatic uncoupling a new coupling operation may be effected without this operation being prevented by the cam, whose position caused the uncoupling. For this purpose, the mechanical connection between the cam and the clutch comprises, among other intermediate devices, an arm which is mounted loose on the shaft controlling the clutch, and is provided with teeth which are normally in engagement with the corresponding teeth of a jaw element in the form of a sliding sleeve which is mounted on the same shaft but is held against rotation with reference to this shaft, the sliding of said jaw element or sleeve in the direction of its separation from the toothed arm being effected by the control of the coupling, in such way that at the time of the next coupling, the arm will be separated from the controlling shaft, and that the said jaw element or sleeve will only return into engagement with the toothed arm when all the parts have returned to their initial position.

The accompanying drawings show by way of example an embodiment of the invention.

Figure 1:
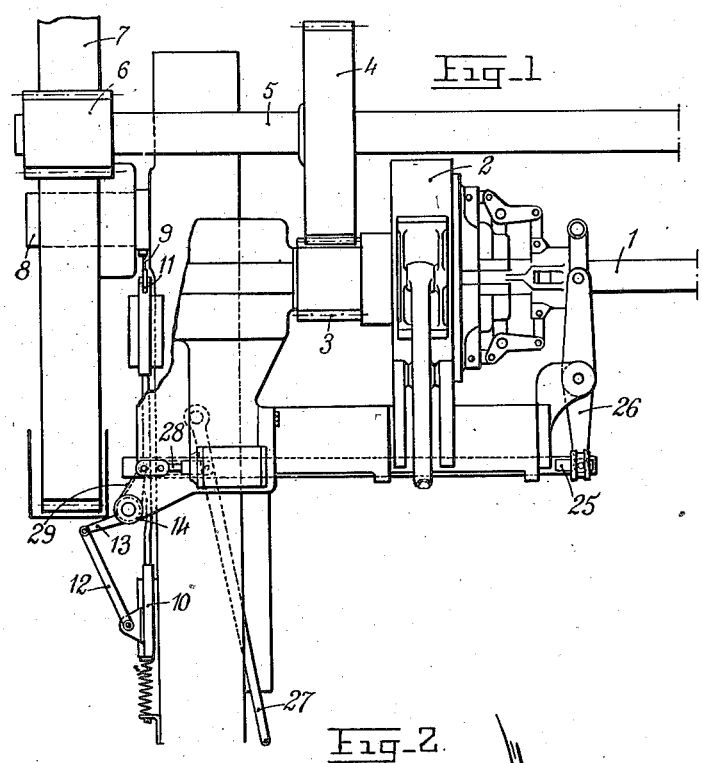
Fig. 1 is an elevational view, parallel to the axis of the crankshaft of the press.
Figure 2:
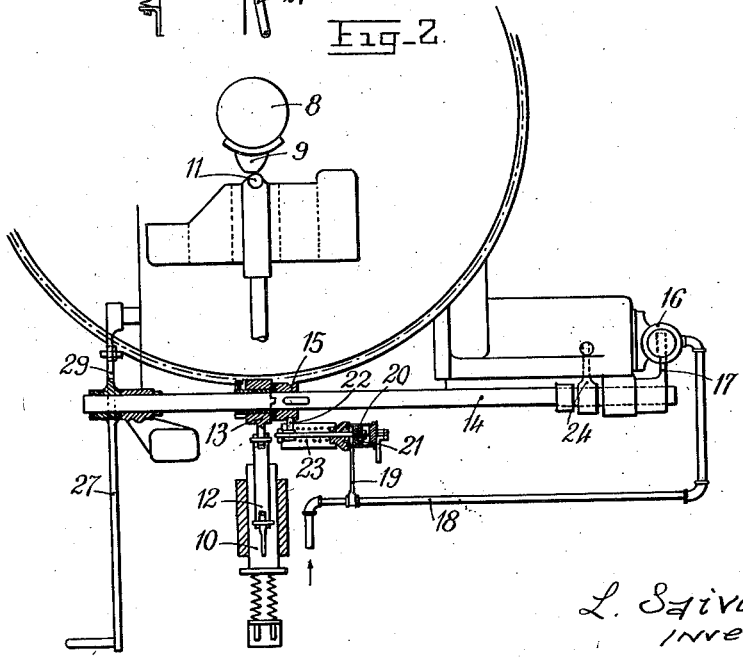
Fig. 2 is an elevational view with parts in section, taken transversely with reference to the crankshaft.
Figure 3:
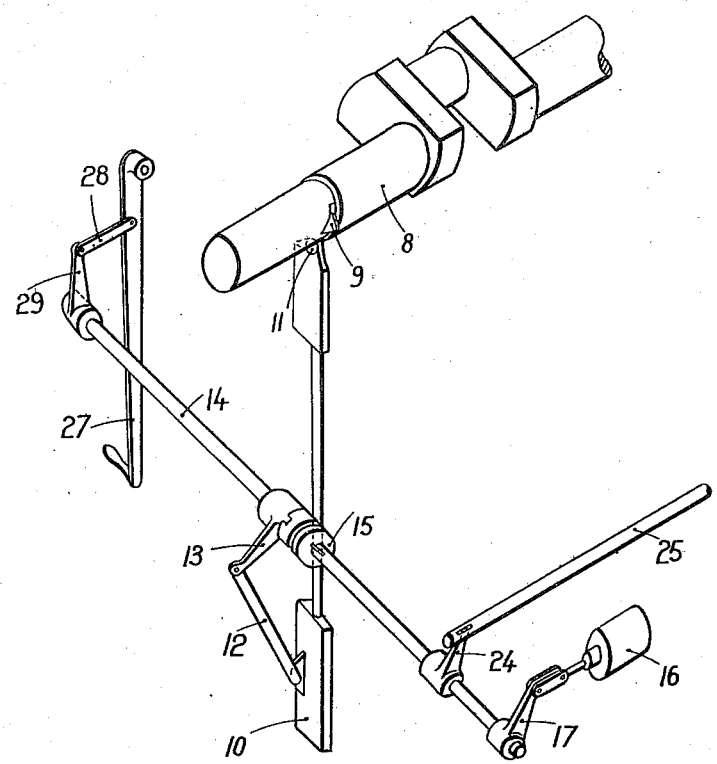
Fig. 3 is a fragmentary perspective detail of the device.

The press is operated by the driving shaft 1, through the clutch 2, the gear-wheels 3 and 4, the intermediate shaft 5, the pinion 6 and the large gear-weel 7 mounted on the crankshaft 8 of the press. On the crankshaft is mounted a cam 9 which operates a resiliently mounted sliding member 10 by means of a roller 11. The said sliding member transmits its alternating movement, by means of a link 12, to an arm 13 which is loose on the shaft or bar 14 controlling the said clutch 2, but which normally engages a jaw-clutch element 15 which is slidable on the said bar but is held against rotation with the bar, and hence the arm 13 transmits its movement of rotation to the shaft 14 through the said jaw-clutch element. Thus by this device, the crankshaft, when at its upper dead centre, will effect the rotation of the shaft 14, in the proper direction for the uncoupling of the press.

In order to effect another coupling of the clutch 2 without acting upon the sliding member 10, which has remained in contact with the cam 9 due to stoppage of the press, the device controlling the coupling is made to act upon the jaw-clutch element 15, in order to separate it from the arm 13. In the present embodiment, this control of the coupling is effected by supplying compressed air to the cylinder 16 whose piston actuates the shaft 14 by means of a lever 17, and there is connected to the conduit 18 supplying the said cylinder, a branch pipe 19 which supplies a cylinder 20 containing a piston 21 adapted to operate the said jaw-clutch element 15 by means of a fork 22. Thus the compressed air will act to separate the jaw-clutch element from the arm 13, and this permits the rotation of the driving shaft 14 without any movement of the arm 13. The supply of compressed air to the cylinder 16 is effected by means of a manually operated valve which, when released, places the conduit 18 in communication with the atmosphere. When the coupling again takes place the operator releases the valve supplying compressed air to cause the pressure to drop through the conduit 18 communicating with the atmosphere and the piston will be urged towards its first position by a spring 23, but owing to the previous rotation of the jaw-clutch element 15 with reference to the arm 13, the teeth of these two parts will no longer coincide for their engagement, and they will only be engaged when—due to the rotation of the crankshaft 8 and of the cam 9 the arm 13 shall have returned to its initial position. In this case, all the parts will now have returned to the positions which they occupied before the uncoupling took place.

The controlling shaft 14 acts upon the clutch 2 by means of a lever 24, a longitudinal bar 25 driven by this lever, and another lever 26. A lever 27 is connected to the shaft 14 by a link 28 and a lever 29, and provides for the starting of the press by hand.

I claim:

1. A device for the automatic uncoupling of a mechanically-operated press at the upper dead centre of its crankshaft, comprising a cam mounted on said crankshaft, a clutch, a shaft controlling said clutch, a movable device actuated by said cam and including a member resiliently mounted for reciprocable movement and a link connected thereto, a coupling adapted to connect the said movable device to the said shaft controlling the clutch including a toothed arm loose on the shaft and connected to the link and a toothed jaw element slidably and non-rotatably mounted on the shaft, and actuating means adapted to act upon the sliding jaw element of the said coupling and to release the connection which it effects, and to place the said clutch in engagement at the same time.

2. A device as claimed in claim 1, in which the actuating means includes, a cylinder provided with a piston for actuating the said clutch, a second cylinder provided with a piston connected to the said toothed jaw element, means for supplying compressed fluid to both cylinders at the same time, and a spring adapted to engage the said toothed jaw element with the said loose arm.

LEON SAIVES.